US009332845B2

(12) United States Patent
Nagayasu

(10) Patent No.: US 9,332,845 B2
(45) Date of Patent: May 10, 2016

(54) VEHICLE SEAT AND SEATBACK-ASSOCIATED OTTOMAN DEVICE

(71) Applicant: TOYOTA BOSHOKU KABUSHIKI KAISHA, Aichi-ken (JP)

(72) Inventor: Hidetaka Nagayasu, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 166 days.

(21) Appl. No.: 14/176,352

(22) Filed: Feb. 10, 2014

(65) Prior Publication Data

US 2014/0225400 A1 Aug. 14, 2014

(30) Foreign Application Priority Data

Feb. 12, 2013 (JP) ................................ 2013-024151

(51) Int. Cl.
| | | |
|---|---|---|
| A47C 1/034 | (2006.01) | |
| B60N 2/20 | (2006.01) | |
| B60N 2/44 | (2006.01) | |
| A47C 7/50 | (2006.01) | |
| A47C 1/0355 | (2013.01) | |
| A47C 1/032 | (2006.01) | |
| A47C 1/035 | (2006.01) | |
| B60N 2/34 | (2006.01) | |
| B64D 11/06 | (2006.01) | |
| A61G 5/12 | (2006.01) | |

(52) U.S. Cl.
CPC .............. *A47C 1/0342* (2013.01); *A47C 1/035* (2013.01); *A47C 1/0355* (2013.01); *A47C 1/03205* (2013.01); *A47C 7/506* (2013.01); *B60N 2/20* (2013.01); *B60N 2/34* (2013.01); *B60N 2/4495* (2013.01); *B64D 11/064* (2014.12); *B64D 11/0643* (2014.12); *A61G 2005/127* (2013.01)

(58) Field of Classification Search
CPC .......... B60N 2/4495; B60N 2/20; B60N 2/34; A47C 7/506; A47C 1/0355; A47C 1/0342; A47C 1/03205; A47C 1/035; A61G 2005/127; B64D 11/064; B64D 11/0643
USPC ................................ 297/85 R, 423.26, 423.3
See application file for complete search history.

(56) References Cited

U.S. PATENT DOCUMENTS 2,617,469 A * 11/1952 Skok ............................. 297/320
3,819,229 A 6/1974 Rogers, Jr. et al.
(Continued)

FOREIGN PATENT DOCUMENTS

| CN | 201120859 | 9/2008 |
|---|---|---|
| CN | 202122337 | 1/2012 |

(Continued)

OTHER PUBLICATIONS

U.S. Appl. No. 14/091,729 to Hidetaka Nagayasu, filed Nov. 27, 2013.

(Continued)

*Primary Examiner* — Milton Nelson, Jr.
(74) *Attorney, Agent, or Firm* — Greenblum & Bernstein, P.L.C.

(57) ABSTRACT

A seatback-associated ottoman device includes: a memory mechanism that mechanically memorizes an unfolded angle position of an ottoman and cancels the memorized unfolded angle position when the unfolded angle of the ottoman is adjusted by the angle adjustment mechanism; and a prohibition mechanism that prohibits the canceling the memorized unfolded angle position of the memory mechanism when the ottoman is placed at the stored position.

4 Claims, 14 Drawing Sheets

(56) References Cited

U.S. PATENT DOCUMENTS

| | | | |
|---|---|---|---|
| 4,410,215 A * | 10/1983 | McKean et al. | 297/423.19 |
| 5,294,177 A | 3/1994 | Rasnick et al. | |
| 7,429,083 B2 * | 9/2008 | Tsuji et al. | 297/423.26 |
| 8,708,417 B2 * | 4/2014 | Mejuhas | 297/423.26 |
| 2005/0012377 A1 * | 1/2005 | Ito | 297/423.26 |
| 2009/0096272 A1 * | 4/2009 | Okano | 297/423.3 |
| 2014/0145476 A1 * | 5/2014 | Nagayasu | 297/86 |

FOREIGN PATENT DOCUMENTS

| | | |
|---|---|---|
| CN | 102793396 | 11/2012 |
| CN | 102848947 | 1/2013 |
| CN | 102905580 | 1/2013 |
| JP | 2-139540 | 11/1990 |
| JP | 3-45748 | 4/1991 |
| JP | 8-24067 | 1/1996 |
| JP | 2005-124950 | 5/2005 |
| JP | 2009-45342 | 3/2009 |
| JP | 2010-221935 | 10/2010 |
| JP | 2011-116303 | 6/2011 |

OTHER PUBLICATIONS

Official Action, including a partial English-language translation thereof, for CN 2014-10048534.1 having an issuance date of Oct. 9, 2015.

* cited by examiner

VEHICLE SEAT AND SEATBACK-ASSOCIATED OTTOMAN DEVICE

INCORPORATION BY REFERENCE

The disclosure of Japanese Patent Application No. 2013-024151 filed on Feb. 12, 2013 including the specification, drawings and abstract is incorporated herein by reference in its entirety.

BACKGROUND OF THE INVENTION

1. Field of the Invention

The invention relates to a seat for a vehicle such as an automobile, an electric railcar, and an airplane, and particularly to a seatback-associated ottoman device in which an ottoman provided in front of a seat cushion of a vehicle seat is moved between an unfolded position and a stored position in association with an angle adjustment of a seatback with respect to the seat cushion.

2. Description of Related Art

There has been developed an ottoman-associated seat in which, when a seatback is tilted backward, a seat cushion is pressed forward and an ottoman is unfolded in front of the seat cushion, so that an occupant sitting on a seat is able to take a comfortable posture (see Japanese Utility Model Publication No. 3-45748 (JP3-45748 U)). Further, in such an ottoman-associated seat, a technique in which an unfolded angle of the ottoman is adjustable to a given angle has been also developed. In a seat that employs the latter technique, an adjusted unfolded angle of an ottoman is mechanically memorized, and when a seatback is subsequently tilted backward again so as to unfold the ottoman forward from a stored position, the ottoman is unfolded to an angle that is adjusted previously and then memorized.

SUMMARY OF THE INVENTION

In the meantime, a memory of an unfolded angle position of the ottoman is cancelable at any time. For example, in a state where the seatback is placed at a normal usage position (an angle position to which the seatback is adjusted at the time of normal sitting) and the ottoman is placed at a stored position, if an operation to cancel the memory of the unfolded angle position of the ottoman is performed by mistake, a locking mechanism that memorizes an unfolded angle of the ottoman is unlocked, and that unfolded angle of the ottoman which is adjusted and stored previously is canceled. On that account, the unfolded angle of the ottoman at the time when the seatback is tilted backward next time to unfold the ottoman forward is different from the angle that an occupant adjusted earlier. The invention provides a vehicle seat and a seatback-associated ottoman device in each of which a memory canceled of an unfolded angle position of an ottoman is not performable except for a state where the ottoman is unfolded forward, so as to prevent the memory canceled of the unfolded angle position of the ottoman from being performed against the will of an occupant.

A seatback-associated ottoman device according to a first aspect of the invention is a seatback-associated ottoman device for a vehicle seat in which an angle of a seatback is adjustable with respect to a seat cushion and which includes an ottoman provided in front of the seat cushion, and the seatback-associated ottoman device includes: an association mechanism that operates the seatback and the ottoman in association with each other, wherein when the seatback is placed at a normal usage position suitable for sitting, the association mechanism causes the ottoman to be stored in a stored position in a front lower portion of the seat cushion, and when the seatback is tilted backward from the normal usage position, the association mechanism moves the ottoman from the stored position to an unfolded position in front of the seat cushion so as to support legs of an occupant from a lower side; an angle adjustment mechanism that adjusts, to a given angle, an unfolded angle of the ottoman placed at the unfolded position; a memory mechanism that mechanically memorizes an unfolded angle position of the ottoman and cancels the memorized unfolded angle position when the unfolded angle of the ottoman is adjusted by the angle adjustment mechanism; and a prohibition mechanism that prohibits the canceling the memorized unfolded angle position of the memory mechanism when the ottoman is placed at the stored position. According to the first aspect, when the ottoman is placed at the stored position, canceling the memorized unfolded angle position of the ottoman which is memorized by the memory mechanism is prohibited by the prohibition mechanism regardless of an adjustment operation of the unfolded angle of the ottoman by the angle adjustment mechanism. On that account, in a state where the ottoman is placed at the stored position, even if the angle adjustment operation of the ottoman is performed by mistake, that unfolded angle position of the ottoman which is adjusted previously is not canceled, but kept memorized.

Further, in the first aspect, the association mechanism may include a pivot link which is pivotally fixed to a base member supporting the vehicle seat and which is connected to the ottoman, a forward-backward moving member to be moved in a front-rear direction according to an angle adjustment of the seatback, and a connecting body that connects the forward-backward moving member to the pivot link so as to transmit their respective movements to each other, the connecting body being capable of changing a connecting position of the forward-backward moving member with respect to the pivot link; the angle adjustment mechanism may include a ratchet connected to the connecting body, and a locking mechanism that locks or unlocks the ratchet or the connecting body with respect to the forward-backward moving member, the locking mechanism being unlocked when the ottoman is placed at the unfolded position and the unfolded angle thereof is adjusted and when the angle adjustment of the seatback is performed; the memory mechanism may include a memory piece engaging with the ratchet while the angle adjustment of the seatback is performed, so as to memorize the unfolded angle of the ottoman, and a stopper that stops unfolding of the ottoman when the memory piece abuts therewith, the stopper being provided on a path of a movement of the memory piece that moves in association with a movement of the ratchet that moves along with a movement of the ottoman in an unfolded direction; and the prohibition mechanism may be a prohibition member that presses the memory piece so as to prevent the memory piece from being disengaged from the ratchet when the ottoman is placed at the stored position. According to the above configuration, when the locking mechanism is unlocked, the ratchet is freely movable together with the ottoman and the connecting body. At this time, if the angle adjustment of the seatback is not performed and the memory piece does not engage with the ratchet, the ratchet solely moves independently from the memory piece, so that the unfolded angle position of the ottoman is adjustable freely. After that, when the locking mechanism is locked, that unfolded angle position of the ottoman which is adjusted at that time is locked. On the other hand, when the angle adjustment of the seatback is performed, the locking mechanism is unlocked, and the ratchet moves along with the unfolding movement of the ottoman according to a backward tilting of the seatback. However, at this time, the memory piece engages with the ratchet and moves together with the ratchet, and therefore, that unfolded angle position of the ottoman which is adjusted previously is memorized, the ottoman is unfolded along with the backward tilting of the seatback, and the unfolding of the ottoman is stopped at a position where the memory piece abuts with the stopper, namely, the unfolded angle position memorized previously. However, when the ottoman is placed at the stored position, an engagement state of the memory piece with respect to the ratchet is maintained by the prohibition member in a state where the memory piece engages with the ratchet. Accordingly, even if the locking mechanism is unlocked, the memory of that unfolded angle position of the ottoman which is adjusted previously is not canceled at this time. When the seatback is tilted backward subsequently and the ottoman is unfolded in association therewith, the ottoman is maintained at the unfolded angle position that is set before the ottoman is moved from the unfolded position to the stored position. Accordingly, even if the locking mechanism is unlocked by mistake in the state where the ottoman is placed at the stored position, it is possible to prevent that unfolded angle position of the ottoman which is memorized previously, from being canceled against the will.

A vehicle seat according to a second aspect of the invention is a vehicle seat in which an angle of a seatback is adjustable with respect to a seat cushion, and the vehicle seat includes: an ottoman provided in front of the seat cushion; and a seatback-associated ottoman device including: an association mechanism that operates the seatback and the ottoman in association with each other, wherein when the seatback is placed at a normal usage position suitable for sitting, the association mechanism causes the ottoman to be stored in a stored position in a front lower portion of the seat cushion, and when the seatback is tilted backward from the normal usage position, the association mechanism moves the ottoman from the stored position to an unfolded position in front of the seat cushion so as to support legs of an occupant from a lower side; an angle adjustment mechanism that adjusts, to a given angle, an unfolded angle of the ottoman placed at the unfolded position; a memory mechanism that mechanically memorizes an unfolded angle position of the ottoman and cancels the memorized unfolded angle position when the unfolded angle of the ottoman is adjusted by the angle adjustment mechanism; and a prohibition mechanism that prohibits the canceling the memorized unfolded angle position of the memory mechanism when the ottoman is placed at the stored position.

Further, in the second aspect, the association mechanism may include a pivot link which is pivotally fixed to a base member supporting the vehicle seat and which is connected to the ottoman, a forward-backward moving member to be moved in a front-rear direction according to an angle adjustment of the seatback, and a connecting body that connects the forward-backward moving member to the pivot link so as to transmit their respective movements to each other, the connecting body being capable of changing a connecting position of the forward-backward moving member with respect to the pivot link; the angle adjustment mechanism may include a ratchet connected to the connecting body, and a locking mechanism that locks or unlocks the ratchet or the connecting body with respect to the forward-backward moving member, the locking mechanism being unlocked when the ottoman is placed at the unfolded position and the unfolded angle thereof is adjusted and when the angle adjustment of the seatback is performed; the memory mechanism may include a memory piece engaging with the ratchet while the angle adjustment of the seatback is performed, so as to memorize the unfolded angle of the ottoman, and a stopper that stops unfolding of the ottoman when the memory piece abuts therewith, the stopper being provided on a path of a movement of the memory piece that moves in association with a movement of the ratchet that moves along with a movement of the ottoman in an unfolded direction; and the prohibition mechanism may be a prohibition member that presses the memory piece so as to prevent the memory piece from being disengaged from the ratchet when the ottoman is placed at the stored position. According to the second aspect, it is possible to obtain the same effect as in the first aspect.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
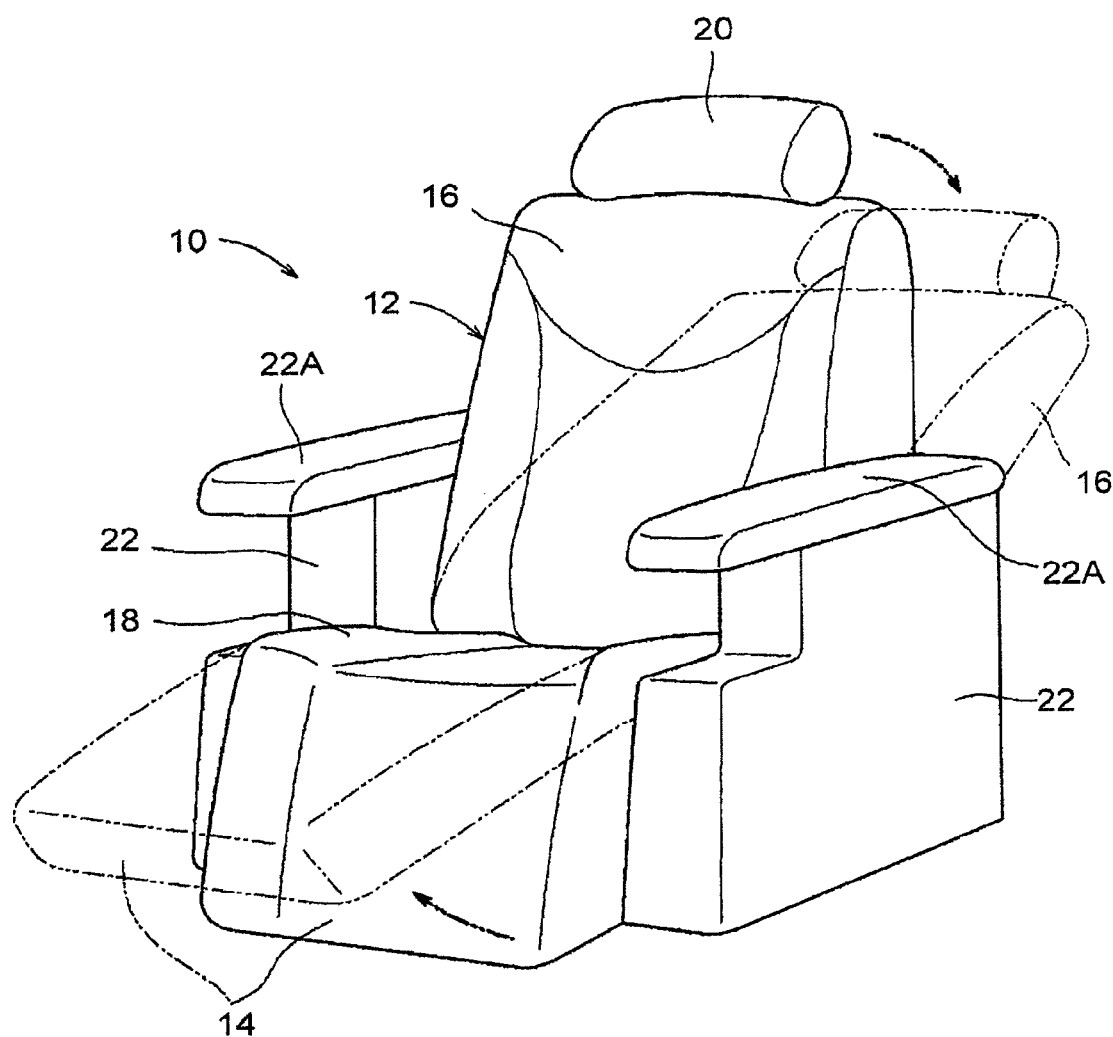
FIG. 1 is a perspective view illustrating an appearance of a vehicle seat according to a first embodiment of the invention.

FIGS. 1 to 5 illustrate a configuration of a vehicle seat 10 according to one embodiment. As illustrated in FIG. 1, the vehicle seat 10 has a configuration of, what is called, a single captain seat disposed in the second row in a vehicle including three rows of sheets, and includes a seatback 16 serving as a backrest for a sitting occupant, and a seat cushion 18 serving as a seat portion. In a front portion of the seat cushion 18, an ottoman 14 that the sitting occupant is able to use as a foot rest is provided. In the present specification, unless especially noted, a front-rear direction is such that a "front" indicates a front-face direction that an occupant sitting on the seat cushion 18 with the seatback 16 as a backrest faces and a "rear" indicates its opposite direction. Further, a right and left direction of the occupant is regarded as a right and left direction, and an up-and-down direction of the occupant is similarly regarded as an up-and-down direction. In FIG. 1, a position change state is illustrated by a continuous line and a virtual line. A continuous-line position state indicates a normal usage position state that is a normal sitting state, and a virtual-line position state indicates a comfortable-posture position state.

At the time when the seatback 16 illustrated in the continuous line is in the normal usage position state in which the seatback 16 is set upright so as to be used as a backrest, the ottoman 14 is in a stored-position state in which the ottoman 14 is folded in a front lower portion of the seat cushion 18. When the seatback 16 is tilted from the normal usage position to a backward tilting position at which the occupant has a comfortable posture as illustrated in the virtual line, the ottoman 14 is changed to an unfolded-position state where the ottoman 14 is raised upward in association with that operation of the seatback 16, so that the ottoman 14 is usable as a foot rest. In this embodiment, in a position state illustrated in the virtual line, it is possible to adjust, to a given position, a position of the ottoman 14 only in an unfolded state. In any unfolded-position state of the ottoman 14 thus adjusted, it is possible to perform a returning operation to put the ottoman 14 back into the stored-position state in association with an operation to raise the seatback 16 from the backward tilting position to its normal upright position. When the ottoman 14 is set to the unfolded-position state again due to an associated operation with the seatback 16 from a state where the ottoman 14 is put back to the stored position, the ottoman 14 is set to the same unfolded position as a previous unfolded position where the ottoman 14 had been set before the ottoman 14 was put back to the stored position. That is, a so-called memory function works.

As described above, in the vehicle seat 10 according to the present embodiment, it is possible to perform a storing-unfolding operation on the ottoman 14 in association with an operation of the seatback 16, and it is also possible to adjust, to a given position, a position state of the ottoman 14 thus set in the unfolded state in association with the operation of the seatback 16. Further, it is possible to perform the returning operation to put the ottoman 14 back into the stored-position state in association with the seatback 16 while keeping the position state thus adjusted. Moreover, since the so-called memory function works, when the ottoman is moved to an unfolded position again in an associated manner, the ottoman is set to the same unfolded position as a previous position where the ottoman had been placed before the returning operation was performed. Thus, it is possible to improve convenience of the ottoman 14.

The following more specifically describes a configuration of each portion of the vehicle seat 10. As illustrated in FIG. 1, the vehicle seat 10 includes a seat main body 12 including the seatback 16 and the seat cushion 18 as previously described, and the ottoman 14 is disposed in the front lower portion of the seat cushion 18. The ottoman 14 is pivotally supported so as to be pivotally movable relative to the seat cushion 18 so that the ottoman 14 is able to take the stored position illustrated in the continuous line or the unfolded position illustrated in the virtual line. On an upper portion of the seatback 16, a headrest 20 for supporting a head of a sitting occupant is disposed such that the headrest 20 is movable upward and downward in the up-and-down direction. Side walls 22 provided upright from a floor are disposed on right and left side portions of the seat main body 12, and the seat main body 12 is connected to base frames 24A of cushion frames 24 (described later) provided in the side walls 22 so that the seat main body 12 is supported by the base frames 24A. The base frames 24A are an example of a base member in the invention. Note that the vehicle seat 10 provided on the floor of the vehicle is provided on the floor via a slide rail (not illustrated herein), so that the vehicle seat 10 is movable slidably in the front-rear direction. As the slide rail, it is possible to use a well-known slide rail as described in Japanese Patent Application Publication No. 2010-221935 (JP2010-221935 A) or the like. Note that each of the side walls 22 on respective sides is configured such that its top face is set as an arm rest 22A that a sitting occupant is able to use as an arm rest.

A backward tilting operation from a continuous-line position of the seatback 16 illustrated in FIG. 1 to a virtual-line position thereof relative to the seat cushion 18 is performed by a recliner (not shown) provided in a connection portion between the seat cushion 18 and the seatback 16. Note that as a basic structure of the recliner, one described in Japanese Patent Application Publication No. 2011-116303 (JP2011-116303 A) or the like is usable, and a specific description thereof is omitted. The recliner includes a locking structure, and the locking structure is released by a pulling operation of a reclining lever (not shown) provided on a side face of the side wall 22 or the like. A spring force is also continuously given to the reclining lever in a direction to maintain the recliner in a locked state. In view of this, when the pulling operation of the reclining lever is canceled, the recliner is locked so as to maintain a position state where the seatback 16 is set.

Figure 2:
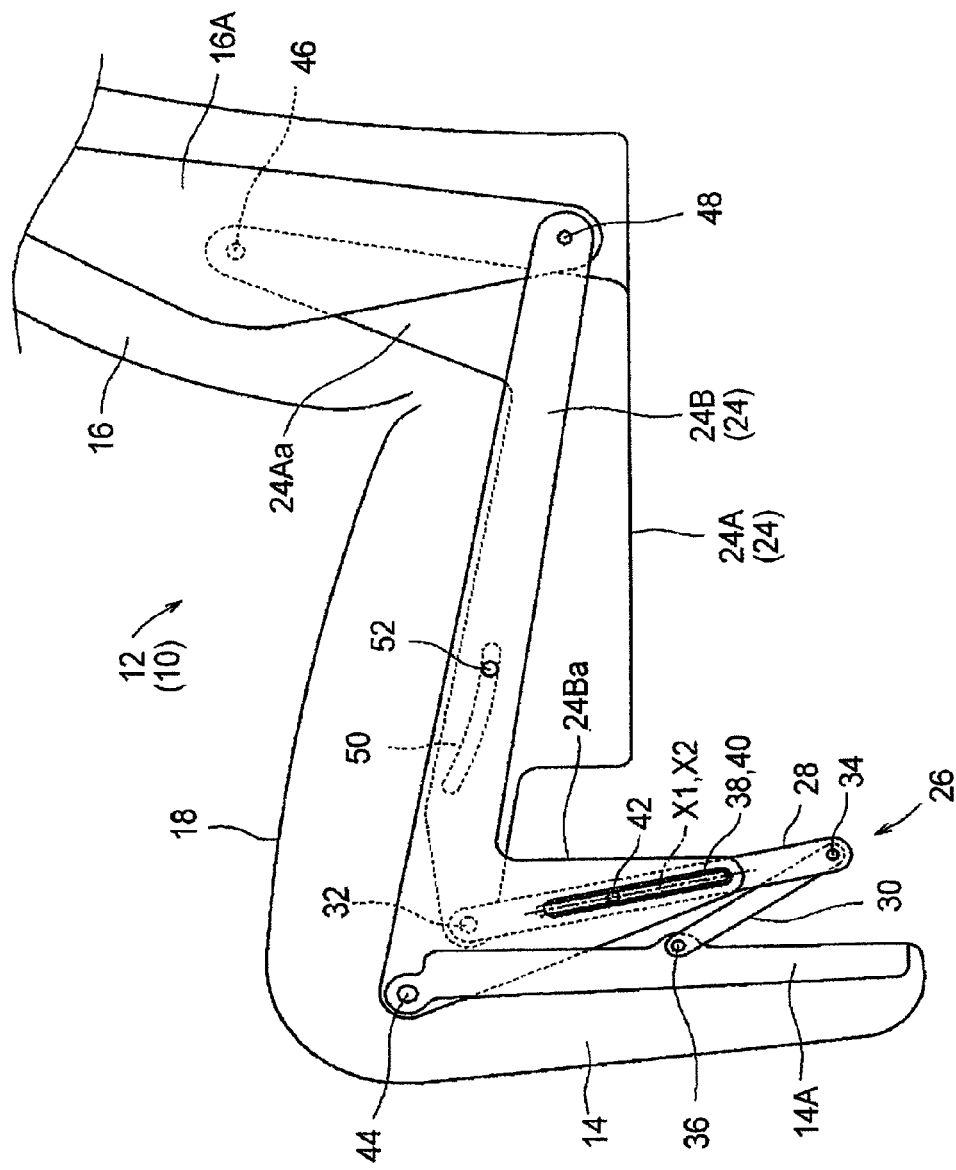
FIG. 2 is a schematic view of an association mechanism for a seatback and an ottoman according to the first embodiment, and is a side view of a case where the ottoman is in a stored-position state.
Figure 3:
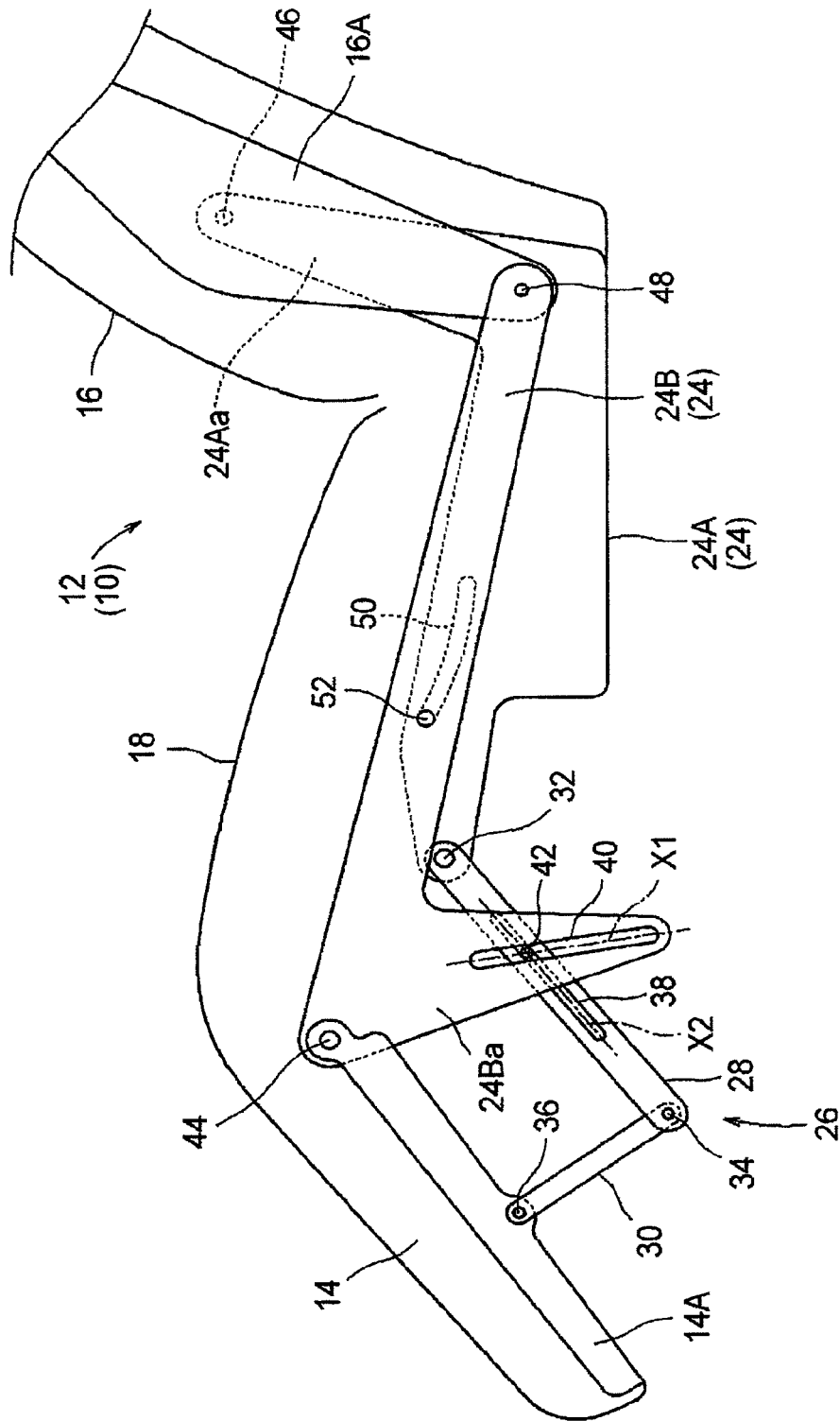
FIG. 3 is a schematic view similar to FIG. 2 and is a side view of a case where the ottoman is in an unfolded-position state.
Figure 4:
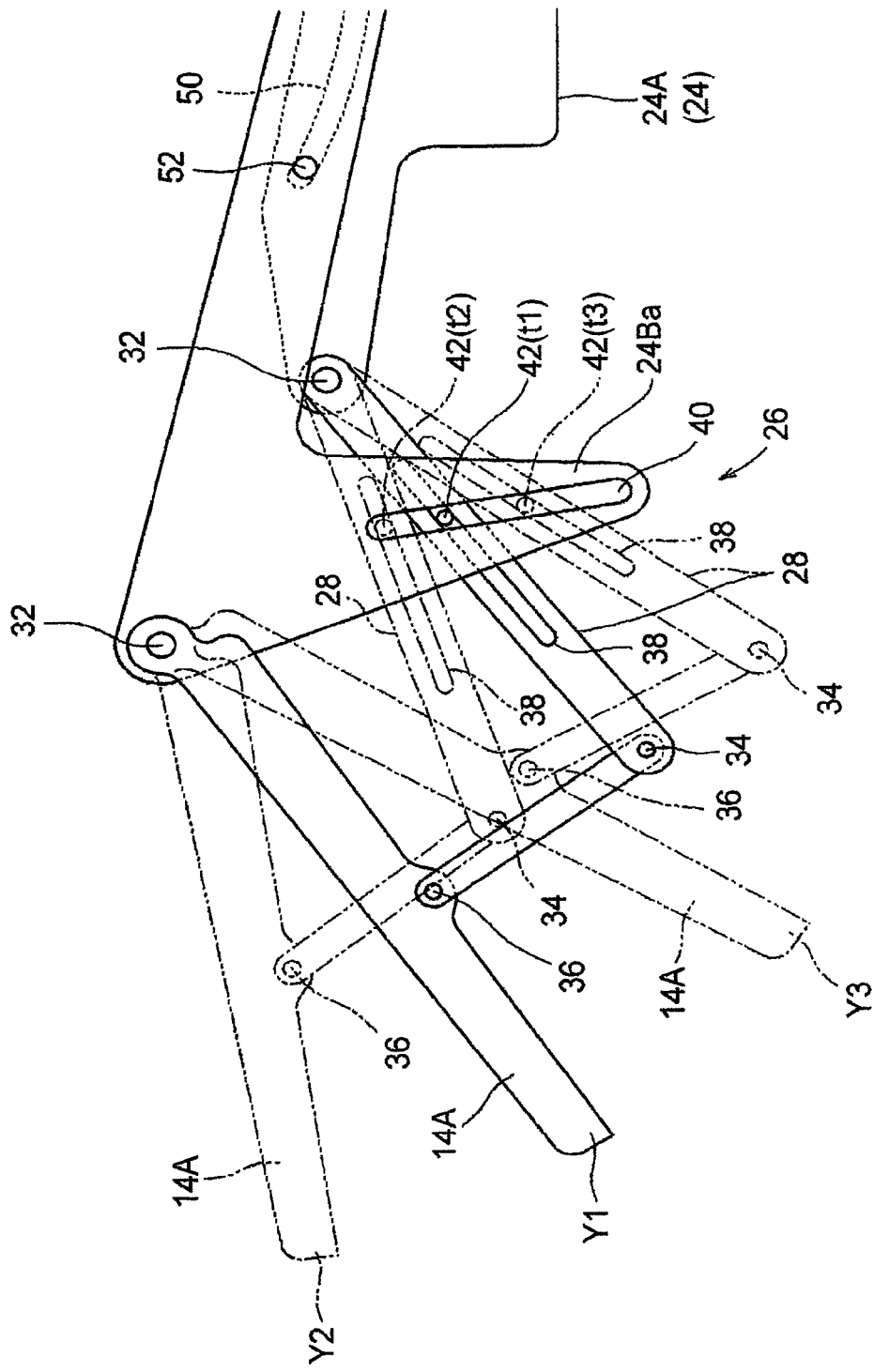
FIG. 4 is an explanatory view illustrating a front end portion in the schematic view of FIG. 3 and illustrating a change in an operation in a case where an unfolded position of the ottoman is adjusted by a link connection configuration.
Figure 5:
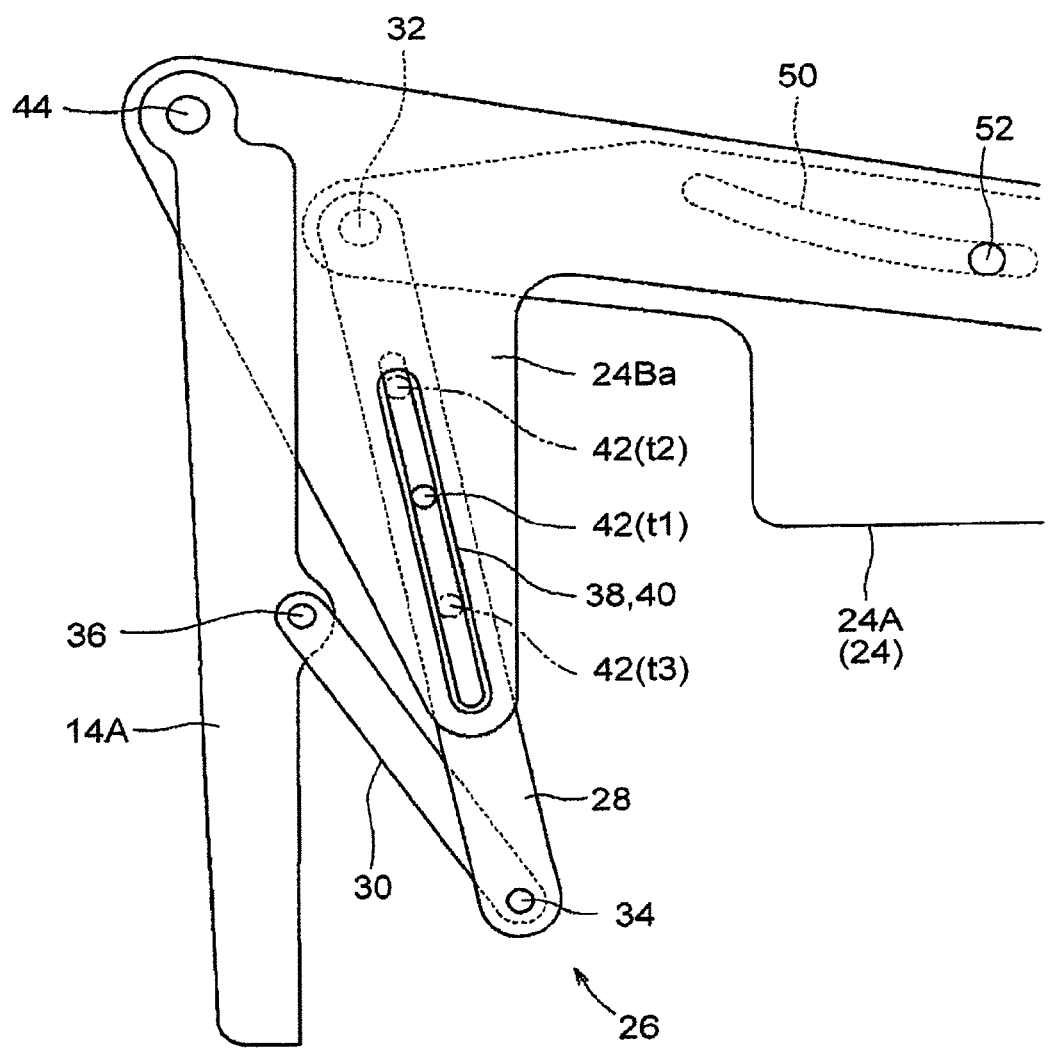
FIG. 5 is an explanatory view illustrating the front end portion in the schematic view of FIG. 2 and illustrating an operating state in a state where the ottoman is placed at a stored position.

Next will be described an associated-operation configuration of the seatback 16 and the ottoman 14, based on FIGS. 2 to 5. These figures schematically illustrate a configuration of a side view of the vehicle seat 10. FIGS. 2 and 5 illustrate an association position relationship in which the seatback 16 is in a normal upright position state and the ottoman 14 is in the stored-position state. FIG. 3 illustrates an association position relationship in which the seatback 16 is tilted backward so as to be in the comfortable-posture position state and the ottoman 14 is in the unfolded-position state. FIG. 4 illustrates an operating state in a case where only the unfolded-position state of the ottoman 14 is adjusted in a predetermined association position state in FIG. 3. Initially, the following describes the associated-operation configuration based on FIG. 2. The cushion frame 24 disposed in the seat cushion 18 is constituted by the base frame 24A and a slide frame 24B. The base frame 24A and the slide frame 24B are disposed in a sitting direction so as to be arranged in parallel with each other. The slide frame 24B is disposed so as to be movable relative to the base frame 24A in the front-rear direction, in FIG. 2. In view of this, a guide slot 50 having a shape of an elongated hole in the front-rear direction is formed in the base frame 24A, and a slide pin 52 is integrally provided in the slide frame 24B. The slide pin 52 engages with the guide slot 50 and slides so as to guide the slide frame 24B while regulating a forward and backward movement of the slide frame 24B. The slide frame 24B is an example of a forward-backward moving member in the invention. A rear end portion (a right end portion in FIG. 2) of the slide frame 24B is rotatably connected, by a pin connection 48, to a lower end portion of a side frame 16A of the seatback 16. The side frame 16A of the seatback 16 is connected, by a pivotal support connection 46, to a projecting portion 24Aa, which is a rear portion of the base frame 24A and is provided so as to extend upward, and the seatback 16 is tilted in the front-rear direction around the pivotal support connection 46. Accordingly, when that upper portion of the seatback 16 which is above the pivotal support connection 46 is tilted backward so as to be in a comfortable posture state, this movement is transmitted to the slide frame 24B via the pin connection 48 as a forward slide movement. On the other hand, a movement of the seatback 16 to be tilted forward from the backward tilting position, which is the comfortable posture state, is transmitted to the slide frame 24B as a backward slide movement. Although not illustrated herein, the recliner is provided in a part 46 where the side frame 16A of the seatback 16 is rotatably and pivotally supported by the projecting portion 24Aa of the base frame 24A. A front end portion (a left end portion in FIG. 2) of the slide frame 24B is connected, by a pivotal support connection 44, to one end of a support frame member 14A of the ottoman 14, and the ottoman 14 is disposed at a position of the front lower portion of the seat cushion 18 in a state where the ottoman 14 is pivotally movable around the pivotal support connection 44. Accordingly, the ottoman 14 also moves forward and backward along with the forward and backward movement of the slide frame 24B. Note that a position state where the ottoman 14 hangs downward as illustrated in FIG. 2 is the stored-position state, and the ottoman 14 is stored in the front lower portion of the seat cushion 18. The unfolded state thereof is a state as illustrated in FIG. 3, which is a position state where the other end portion of the ottoman 14 pivots upward. The base frame 24A is provided so as to be slidably movable relative to the floor via a slide rail (not shown). Because of this, the whole vehicle seat is provided so as to be movable forward and backward relative to the floor in the present embodiment. Note that a cushion pad constituting a seat portion of the seat cushion 18 is placed on the slide frame 24B. Hereby, a sitting surface on a top face of the seat cushion 18 is provided integrally with the slide frame 24B, and moves forward and backward along with the forward and backward movement of the slide frame 24B. Accordingly, along with a backward tilting of the seatback 16, the slide frame 24B moves in the forward direction, and the sitting surface of the seat cushion 18 also moves in the forward direction.

A front end portion (a left end portion in FIG. 2) of the base frame 24A and the ottoman 14 are connected by a first link member 26 (an example of a pivot link of the present invention). The first link member 26 is configured such that two elongated tabular link member A 28 and link member B 30 (examples of a moving member of the present invention) are connected by a pin connection 34. One end of the link member A 28 is relatively pivotally connected, by a pin connection 32, to the front end portion of the base frame 24A, and similarly, the other end thereof is relatively pivotally connected, by the pin connection 34, to one end of the link member B 30. The other end of the link member B 30 is relatively pivotally connected, by a pin connection 36, to a substantially central position (see FIG. 2) of the support frame member 14A of the ottoman 14. In the front end portion of the slide frame 24B, a slide portion 24Ba is formed integrally therewith so as to extend downward, as illustrated in FIG. 2. The link member A 28 of the first link member 26 is disposed in a position state where surfaces of the link member A 28 and the slide portion 24Ba are overlapped with each other. The slide portion 24Ba and the link member A 28 disposed in such an overlapped position state include respective guide slots 38, 40 having a shape of an elongated hole and formed in a linear shape. The respective guide slots 38, 40 are disposed in such a relationship that when the ottoman 14 is placed in the stored-position state as illustrated in FIG. 2, respective members are provided and connected to each other so that respective axes X1, X2 of the respective guide slots 38, 40 coincide with each other. Note that an axis of the guide slot 40 formed in the slide portion 24Ba is X1, and an axis of the guide slot 38 formed in the link member A 28 is X2. A common connecting pin member 42 (an example of a connecting body of the present invention) is passed through the respective guide slots 38, 40 so as to engage therewith. The connecting pin member 42 is slidably movable relative to the respective guide slots 38, 40, and is able to change an unfolded angle of the ottoman 14 by changing a relative positional relationship of the connecting pin member 42 with respect to the guide slots 38, 40. Note that, between the connecting pin member 42 and the slide portion 24Ba, a locking mechanism (which will be described later in detail) for fixing an engaged position state of the connecting pin member 42 with respect to the guide slot 40 is provided.

Next will be described an associated operation in the aforementioned associated-operation configuration of the seatback 16 and the ottoman 14, based on FIGS. 2 to 5. The state in FIG. 2 illustrates a case where the vehicle seat 10 illustrated in FIG. 1 is in the normal usage position state for a normal sitting posture illustrated in the continuous line. In this state, the seatback 16 is in a state where the seatback 16 stands upright and the ottoman 14 is the stored-position state where the ottoman 14 is stored in the front lower portion of the seat cushion 18. In this state, the side frame 16A of the seatback 16 is set upright in a state where the side frame 16A is connected, by the pivotal support connection 46, to the projecting portion 24Aa of the base frame 24A, and the slide frame 24B connected, by the pin connection 48, to the lower end portion of the side frame 16A is placed at a relatively backward position with respect to the base frame 24A. In this position state of the frames 24A, 24B, an engagement relationship between the slide pin 52 provided in the slide frame 24B and the guide slot 50 provided in the base frame 24A is in a state where the slide pin 52 engages with a rear portion of the guide slot 50, in FIG. 2. Such an operation position state of the slide frame 24B is transmitted to the ottoman 14 connected to the front end portion of the slide frame 24B by the pivotal support connection 44. A position control on the ottoman 14 is performed according to a control by the first link member 26 provided between the ottoman 14 and the front end portion of the base frame 24A. The link member A 28 of the first link member 26 is connected, by the pin connection 32, to the front end portion of the base frame 24A in a pivotally movable manner. The pivoting thereof is performed along with a movement of the slide portion 24Ba in the front-rear direction. This is because the connecting pin member 42 fixed to the slide portion 24Ba of the slide frame 24B by the locking mechanism (not shown) engages with the guide slot 38 provided in the link member A 28, in a slidable manner in a direction along the axis X2. In the state illustrated in FIG. 2, the slide portion 24Ba, i.e., the slide frame 24B is placed at a most backward position, so that a lower end of the other end of the link member A 28 is also placed at a most backward position. This position state is transmitted, via the link member B 30 connected to the link member A 28 by the pin connection 34, to that support frame member 14A of the ottoman 14 which is connected to the link member B 30 by the pin connection 36, thereby maintaining the ottoman 14 in the stored position state.

The following describes a moving operation in which the seatback 16 is tilted backward as illustrated in the virtual line from the upright position state of the seatback 16 as illustrated in the continuous line in FIG. 1, thereby causing the ottoman 14 to be in the comfortable posture state where the ottoman 14 is unfolded upward. FIG. 3 illustrates an operating state of the comfortable posture state. Along with a backward tilting of the seatback 16, the side frame 16A of the seatback 16 pivots clockwise around the pivotal support connection 46 as a pivot axis, so that the slide frame 24B connected to the lower end portion thereof by the pin connection 48 is caused to slide forward. That is, the slide frame 24B slides forward relative to the base frame 24A. In this position state of the frames 24A, 24B, an engagement relationship between the slide pin 52 provided in the slide frame 24B and the guide slot 50 provided in the base frame 24A is in a state where the slide pin 52 engages with a front end of the guide slot 50, in FIG. 3. Along with the forward movement of the slide frame 24B as illustrated in FIG. 3, the slide portion 24Ba formed integrally therewith also moves forward. Along with this, the connecting pin member 42 fixed to the slide portion 24Ba pivots the link member A 28 clockwise around, as a pivot axis, a portion connected to the front end portion of the base frame 24A by the pin connection 32 (in FIG. 3), so as to move forward the lower end of the other end of the link member A 28. The movement of the lower end of the link member A 28 is transmitted to the support frame member 14A of the ottoman 14 via the link member B 30 connected by the pin connections 34, 36, so as to pivot the ottoman 14 clockwise around, as a pivot axis, a portion connected to the slide frame 24B by the pivotal support connection 44, so that the ottoman 14 is unfolded upward. At this time, that portion of the ottoman 14 which is connected by the pivotal support connection 44 also moves forward, and thus, an unfolding operation of the ottoman 14 is performed while the ottoman 14 itself is moving forward. The pivoting of the link member A 28 around the pin connection 32 as a pivot axis at the time when the ottoman 14 pivots to be unfolded is performed such that, along with the forward movement of the connecting pin member 42, the connecting pin member 42 slides inside the guide slot 38 of the link member A 28 in a direction toward the lower end of the link member A 28. As such, in the present embodiment, the associated operation of the seatback 16 and the ottoman 14 is performed, so that the normal posture state as illustrated in FIG. 2 is changed to the comfortable posture state as illustrated in FIG. 3. Note that the comfortable posture state as illustrated in FIG. 3 is changed to the normal posture state as illustrated in FIG. 2 by performing an operation reverse to the aforementioned operation.

In the present embodiment, in the comfortable posture state in which the ottoman 14 pivots to be unfolded due to the associated operation along with the backward tilting of the seatback 16 as illustrated in FIG. 3, it is possible to adjust only an unfolded angle state of the ottoman 14 to a given angle in conformity to a preference of the sitting person, without changing a posture state of the seatback 16. That is, while the seatback and the ottoman are operated in association with each other, a relative positional relationship between the seatback and the ottoman in the associated operation is adjustable. This operation is described below with reference to FIG. 4. That unfolded angle position of the ottoman 14 which is illustrated in a continuous line in FIG. 4 is assumed a position Y1 at which the ottoman 14 is unfolded by pivoting in advance due to the associated operation with the seatback 16. Adjustment of the position Y1 by pivoting the ottoman 14 so as to be changed to positions Y2, Y3 illustrated in virtual lines is performable in such a manner that the connecting pin member 42 fixed to the slide portion 24Ba by the locking mechanism (not shown) is released so that the connecting pin member 42 slides inside the guide slot 40 formed in the slide portion 24Ba. When the ottoman 14 is adjusted to the rotating position Y2, the connecting pin member 42 is released from the fixation to the slide portion 24Ba so as to slide from a position t1 to a position t2, and the connecting pin member 42 is fixed again to the slide portion 24Ba. Further, when the ottoman 14 is adjusted to the rotating position Y3, a fixation position of the connecting pin member 42 with respect to the slide portion 24Ba is similarly moved from the position t1 to a position t3 in the guide slot 40. At this time, along with the change of the rotating position of the ottoman 14, the engaged position state of the connecting pin member 42 with respect to the guide slot 38 of the link member A 28 is also changed by sliding. Even in a case where the position of the connecting pin member 42 with respect to the slide portion 24Ba is changed as such so as to change the unfolded angle of the ottoman 14, when the seatback 16 is put back to a normal posture position and the ottoman 14 is put back to the stored position, the position of the ottoman 14 does not change regardless of the position of the connecting pin member 42, and the ottoman 14 is placed at the stored position. This state is illustrated in FIG. 5. As described above, even in a case where the position of the connecting pin member 42 is changed to t1, t2, t3, when the ottoman 14 is placed at the stored position, the guide slot 40 of the slide portion 24Ba and the guide slot 38 of the link member A 28, in each of which the connecting pin member 42 slides, are placed at positions where the guide slot 40 and the guide slot 38 are overlapped with each other. Accordingly, the position of the link member A 28 does not change regardless of the position of the connecting pin member 42.

Figure 6:
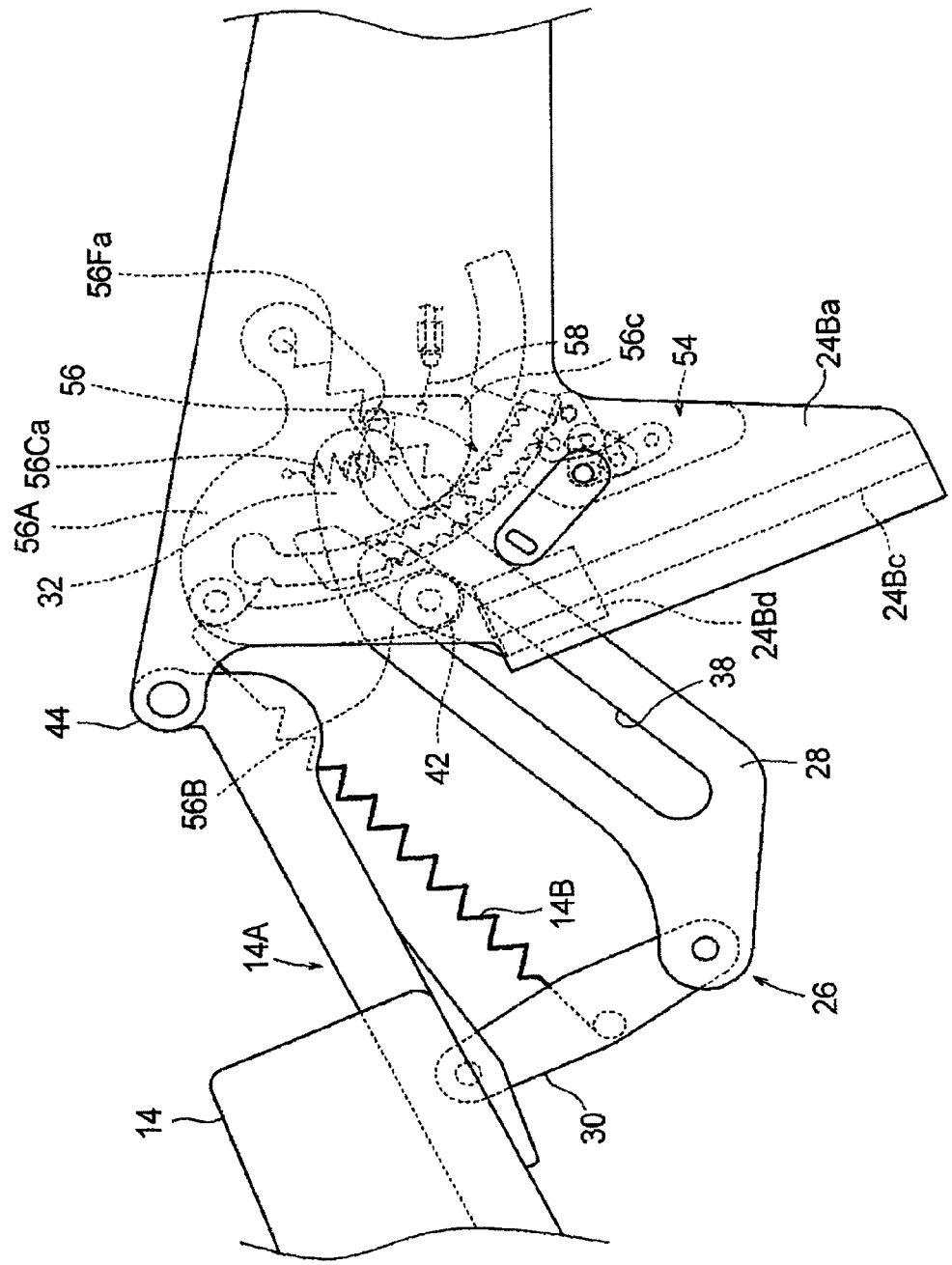
FIG. 6 is an explanatory view around a front end portion of the seat cushion, illustrating a state where the seatback is tilted backward to a predetermined angle in an example that exemplifies the above embodiment.

In FIGS. 2 to 5, one embodiment of the present invention is described based on schematic views. However, the following describes examples that realize the embodiment, based on FIGS. 6 to 14. Note that FIGS. 6 to 11 illustrate only a layout of each part on a plane, and a three-dimensional positional relationship is ignored. FIG. 6 illustrates a configuration around an ottoman operation portion at the time when the seatback is tilted backward by only a predetermined angle (e.g., a torso angle=40 degrees) from the normal usage position like FIG. 3, that is, a configuration around the front end portion of the seat cushion. In the descriptions of FIGS. 2 to 5, the connecting pin member 42 engages with the guide slot 40 of the slide portion 24Ba. However, in FIG. 6, the connecting pin member 42 is supported by a slider 24Bd, so that the slider 24Bd is slidable along a guide rail 24Bc of the slide portion 24Ba. Here, the guide rail 24Bc is provided so as to correspond to the guide slot 40 in FIGS. 2 to 5. Further, as enlarged and illustrated in FIG. 12, the connecting pin member 42 is also supported by the connecting link 56B, and the connecting link 56B is pivotally connected to a tip of a ratchet 56A. FIGS. 6, 12 illustrate the locking mechanism 54 that is not illustrated in FIGS. 2 to 5. Further, a memory mechanism 56 is provided adjacent to the locking mechanism 54. The ratchet 56A of FIG. 12 is part of the memory mechanism 56. When the locking mechanism 54 locks a position of the ratchet 56A of the memory mechanism 56, the position of the connecting pin member 42 is eventually locked via the connecting link 56B.

As illustrated in FIG. 12, the locking mechanism 54 is constituted by combining a cable link 54B, a driving link 54D, a stopper link 54C, and a lock plate 54E. The cable link 54B is connected to a cable (not shown) that is operated when the unfolded angle of the ottoman is adjusted, and a cable (not shown) from the reclining lever (not shown) that is operated when a tilted position of the seatback is adjusted. The cable link 54B is connected to the slide portion 24Ba pivotally around a connecting shaft 54Ba via which the cable link 54B is connected to the driving link 54D. The driving link 54D is integrally connected to the cable link 54B via the connecting shaft 54Ba, and when the cable link 54B is pivoted, the driving link 54D is also pivoted together. The driving link 54D is configured to have a triangular shape. The connecting shaft 54Ba is provided in one of vertices of the triangular shape, and the stopper link 54C and the lock plate 54E are connected respectively to the other two vertices via connecting pins 54Da, 54Db in a relatively pivotal manner. The stopper link 54C is pivotally fixed to the slide portion 24Ba around a pivot shaft 54Ca provided in an end portion of the stopper link 54C. The lock plate 54E is configured to have a triangular shape. One of vertices of the triangular shape is connected to the connecting pin 54Db, one of the other two vertices is pivotally fixed to the slide portion 24Ba around a pivot shaft 54Ea, and the other one of the other two vertices includes a lock pin 54Eb. Moving ranges of the connecting pins 54Da, 54Db, the lock pin 54Eb, and the connecting shaft 54Ba are regulated respectively by guide slots 25A, 25B, 25C, and 25D. FIG. 12 illustrates positions of the connecting pins 54Da, 54Db, the lock pin 54Eb, and the connecting shaft 54Ba at the time when a cable (not shown) for adjusting the unfolded angle of the ottoman is pulled so that the cable link 54B is pivoted as shown in a continuous line. When an operation of the cable is canceled and the cable link 54B is put back from a pivoting state and set to a position as shown in a virtual line, the connecting pins 54Da, 54Db, the lock pin 54Eb, and the connecting shaft 54Ba move to respective positions opposite to positions illustrated in FIG. 12 within the guide slots 25A, 25B, 25C, and 25D. Note that the guide slots 25A, 25B, 25C and 25D are provided in a cover (not shown) provided so as to entirely cover the slide portion 24Ba.

As illustrated in FIG. 12, when the ottoman 14 is placed at the stored position, a tip of an unlock bracket 54A is placed at a position where the tip abuts with the connecting pin 54Da. At this time, even in a case where the operation of the cable is canceled and the cable link 54B is placed at the position shown in the virtual line, when the connecting pin 54Da is pressed by the unlock bracket 54A, the cable link 54B is pivoted via the driving link 54D so as to be placed at the position shown in the continuous line. On that account, when the ottoman 14 is placed at the stored position, the locking mechanism 54 forcibly enters an unlock state regardless of the operation of the cable. Although not illustrated herein, the unlock bracket 54A is fixed to the base frame 24A (see FIG. 2), and its position does not change regardless of the tilted position of the seatback. In a state illustrated in FIG. 12, a lock pin 54Eb of the locking mechanism 54 does not mesh with a gear portion 56Aa of the ratchet 56A of the memory mechanism 56. On this account, the locking mechanism 54 does not lock the position of the ratchet 56A of the memory mechanism 56. In a state where the operation of the cable is canceled or the ottoman 14 is placed at the unfolded position, the cable link 54B is placed at the position shown in the virtual line, and the links 54D, 54C and the lock plate 54E pivot, so that the lock pin 54Eb of the locking mechanism 54 mesh with the gear portion 56Aa of the ratchet 56A of the memory mechanism 56, thereby resulting in that the locking mechanism 54 locks the position of the ratchet 56A of the memory mechanism 56. As a result, the position of the connecting pin member 42 with respect to the slide portion 24Ba is locked.

Figure 7:
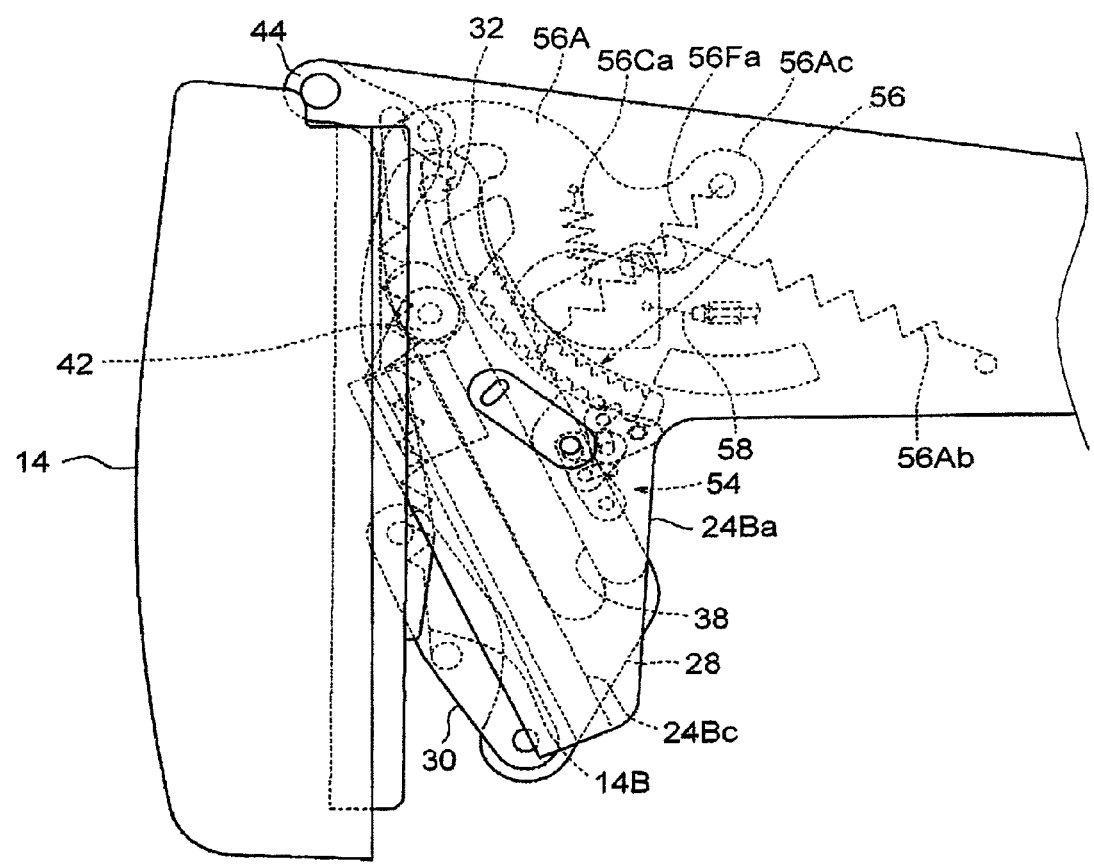
FIG. 7 is an explanatory view similar to FIG. 6, illustrating a state where the seatback is put back to a normal usage position in the above example.
Figure 8:
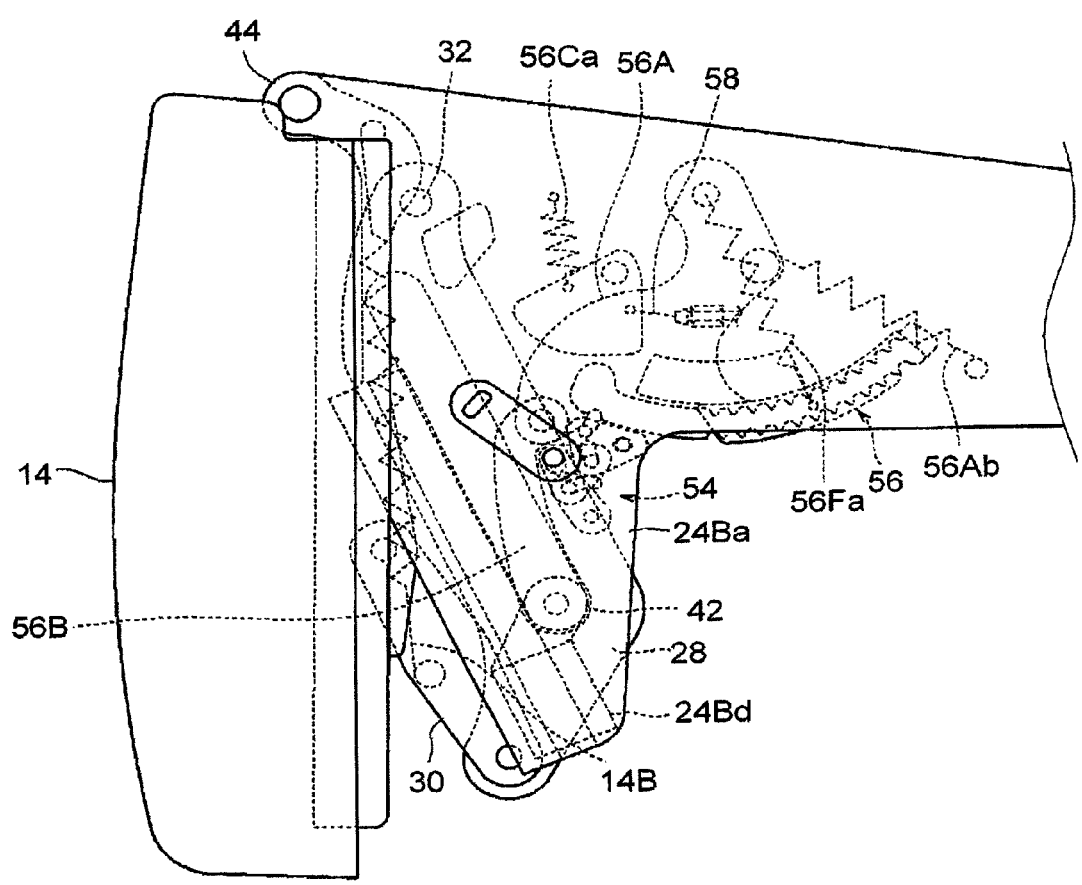
FIG. 8 is an explanatory view illustrating a state where the seatback is put back to the normal usage position similarly to FIG. 7, and a connecting body moves downward.
Figure 12:
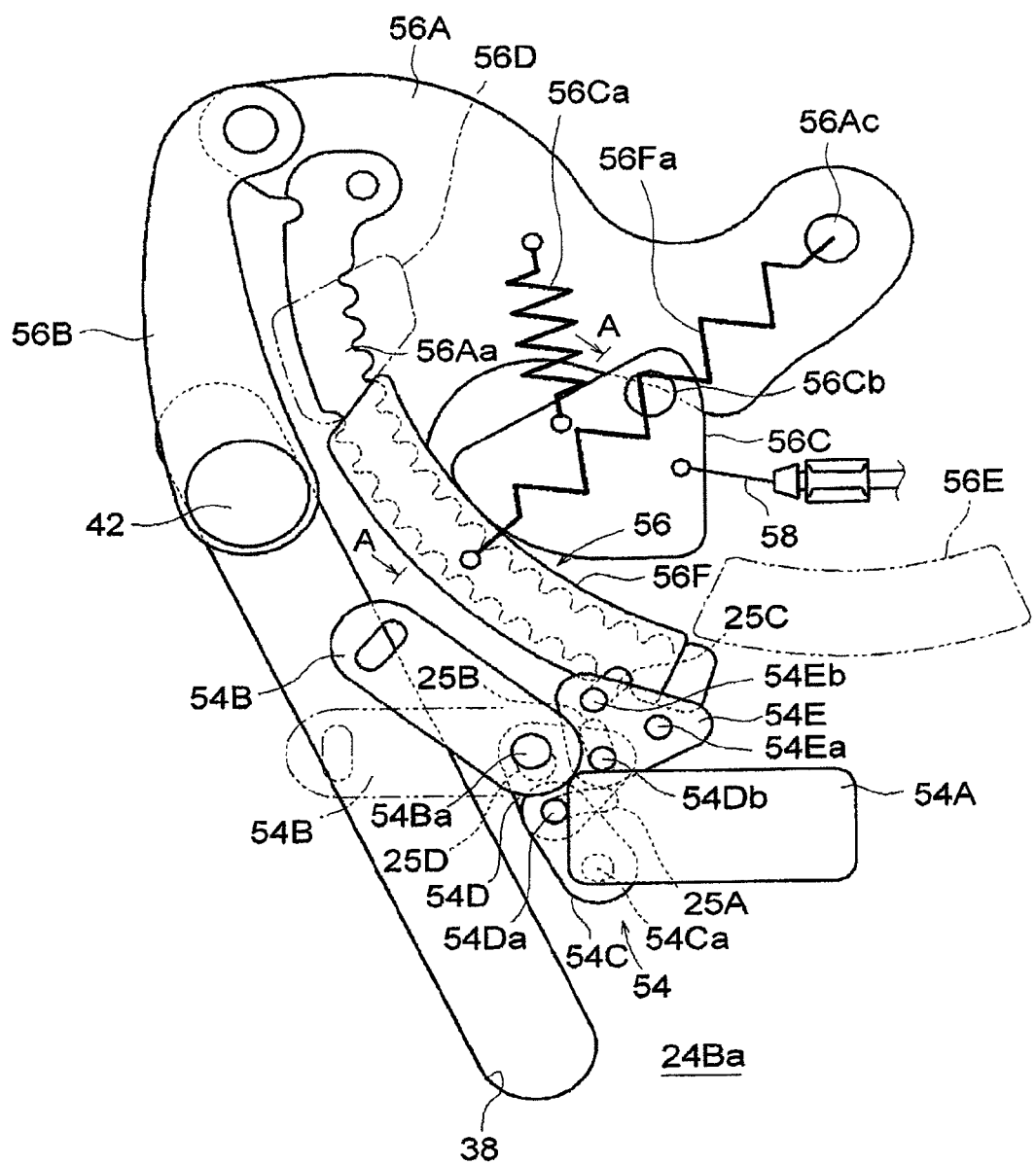
FIG. 12 is an enlarged explanatory view extracting and illustrating a configuration around the locking mechanism in the above example.
Figure 13:
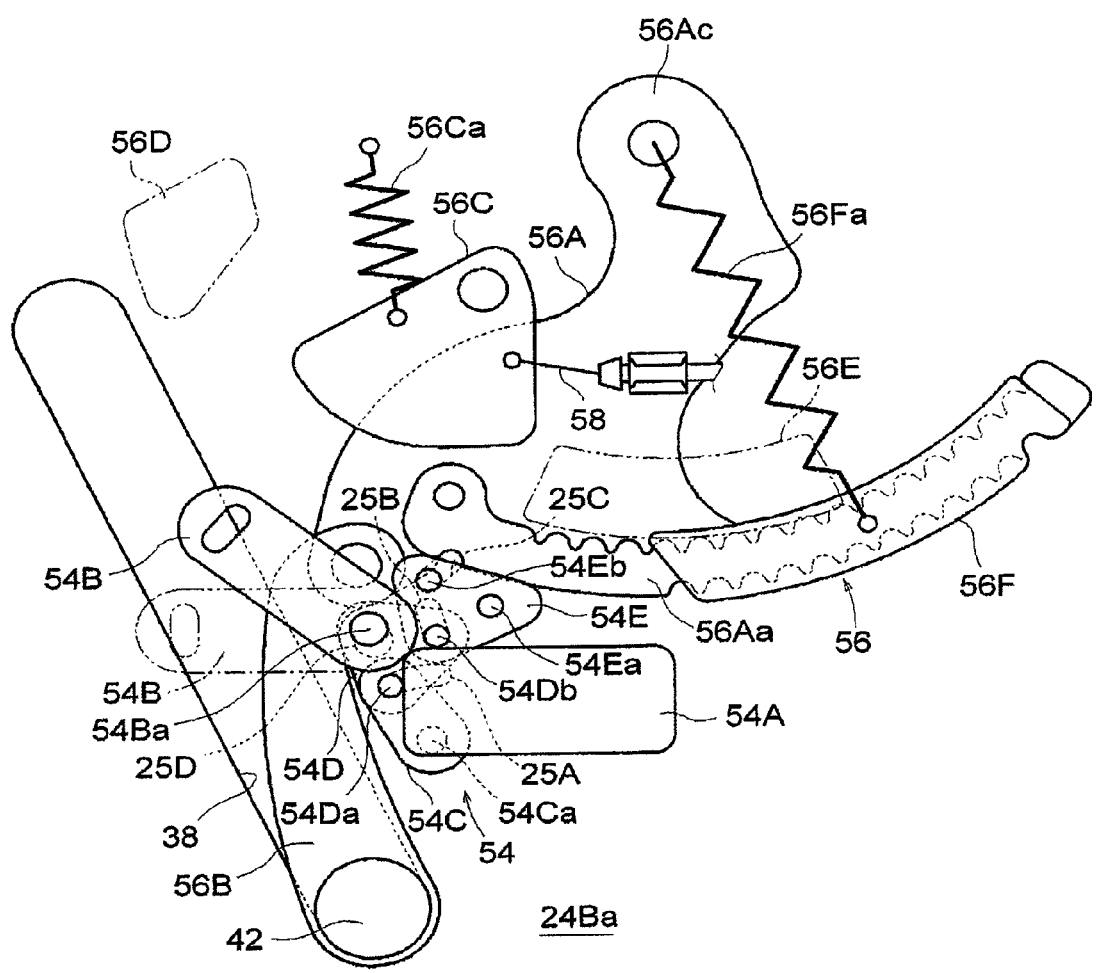
FIG. 13 is an explanatory view to describe a movement state of the connecting body in the above example.

FIG. 7 illustrates a state when the seatback is placed at the normal usage position. Note that the following description refers to FIGS. 12, 13 to facilitate understanding. At this time, the ottoman 14 is placed at the stored position, and unlike the above description, the locking mechanism 54 does not lock the position of the ratchet 56A of the memory mechanism 56. Further, the guide slot 38 of the link member A 28 is parallel to the guide rail 24Bc of the slide portion 24Ba, and a path of movement of the connecting pin member 42 by the guide slot 38 coincides with a path of movement of the connecting pin member 42 by the guide rail 24Bc. In the meantime, a tension spring 56Ab (an example of a moving mechanism of the present invention) is provided over between the ratchet 56A and the base frame 24A (see FIG. 2). On that account, the ratchet 56A is biased counterclockwise around a pivot shaft 56Ac by a tensile force of the tension spring 56Ab. As a result, as illustrated in FIG. 7, when the seatback is placed at the normal usage position and the ottoman 14 is placed at the stored position, the connecting pin member 42 is moved from a position as illustrated in FIGS. 7, 12 to a position as illustrated in FIGS. 8, 13 by the tensile force of the tension spring 56Ab. When the connecting pin member 42 is moved to a position away from the pin connection 32 of the guide slot 38 of the link member A 28 as such, a torque required to pivot the link member A 28 by the connecting pin member 42 is reduced. This is because a moment arm at the time of pivoting the link member A 28 becomes long. This makes it possible to reduce an operating force at the time of tilting the seatback backward to move the ottoman 14 to the unfolded position, from the state where the seatback is placed at the normal usage position and the ottoman 14 is placed at the stored position.

Figure 9:
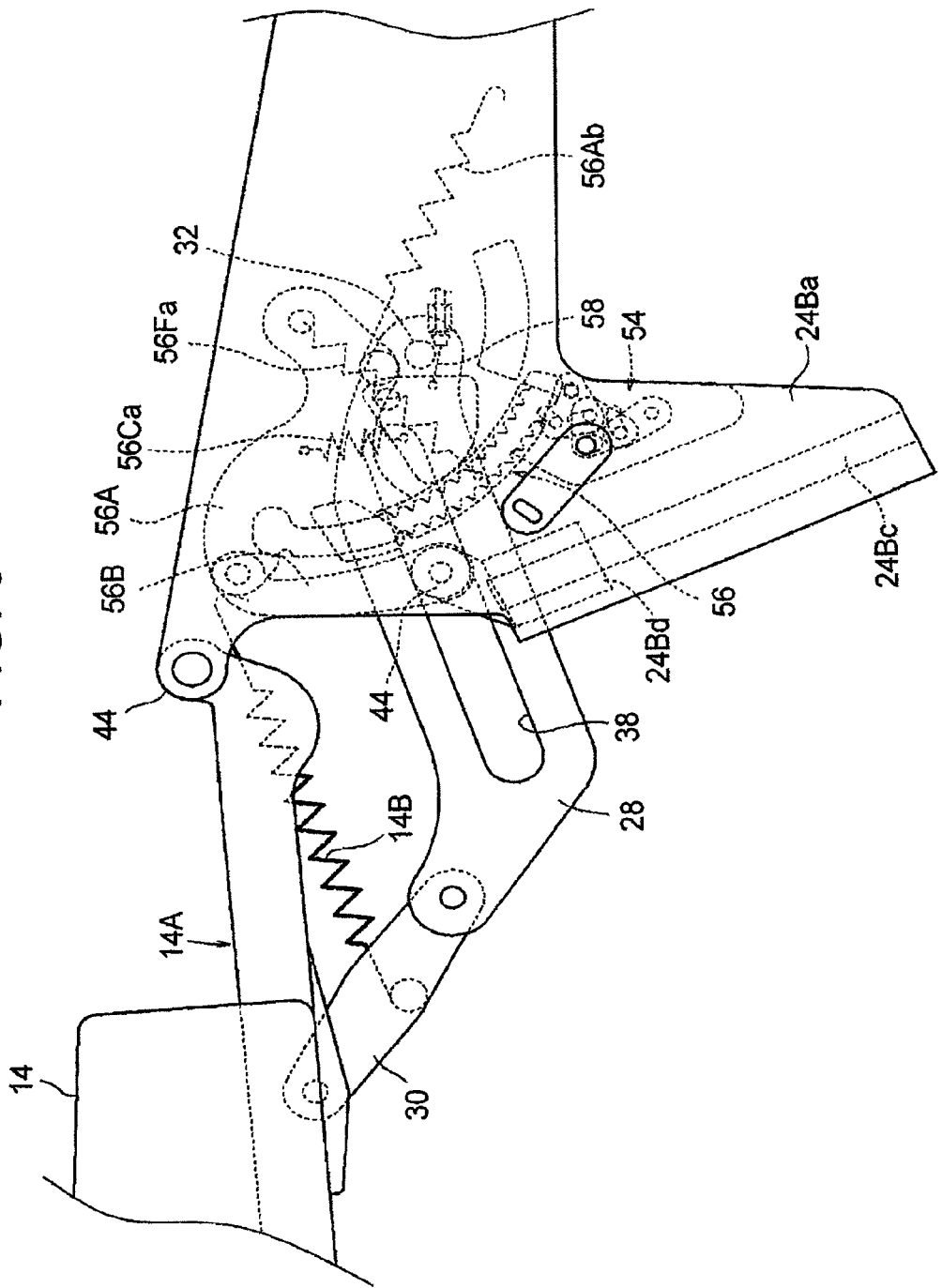
FIG. 9 is an explanatory view similar to FIG. 6, illustrating a state where the seatback is tilted backward to an angle beyond the predetermined angle in the above example.
Figure 10:
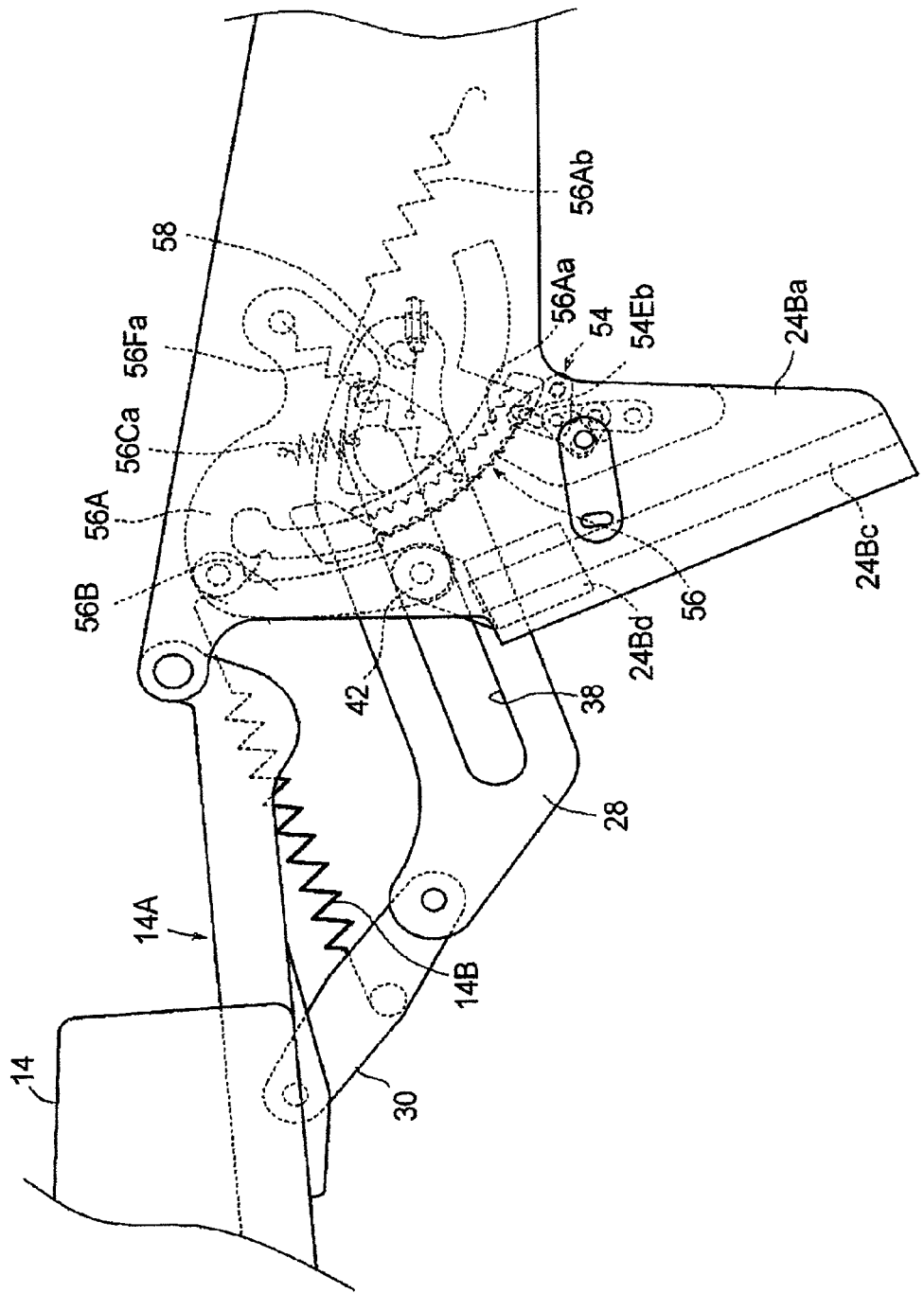
FIG. 10 is an explanatory view illustrating a state where the seatback is tilted backward to the angle beyond the predetermined angle similarly to FIG. 9 and the seatback is locked by a locking mechanism at this position.

FIG. 9 illustrates a state where the seatback is tilted backward largely beyond the above-mentioned predetermined angle (e.g., a torso angle=51 degrees). At this time, as described above, the link member A 28 is pivoted clockwise via the connecting pin member 42 due to a forward movement of the slide frame 24B (see FIG. 3) and the slide portion 24Ba, the ottoman 14 is unfolded forward via the link member B 30. Further, the support frame member 14A of the ottoman 14 moves the ottoman 14 forward in FIG. 9, as compared with a case where the ottoman 14 is placed at the stored position as illustrated in FIGS. 7, 8. This is because the support frame member 14A includes a mechanism for moving the ottoman 14 forward as the unfolded angle of the ottoman 14 increases. Note that FIG. 9 assumes that the connecting pin member 42 is placed in the upper end portion of the slide portion 24Ba. FIG. 10 illustrates a state where an operation to tilt the seatback backward is stopped in a state where the seatback is tilted largely backward similarly to FIG. 9. At this time, an operation of the reclining lever (not shown) that is operated to tilt the seatback backward is canceled, so that the lock pin 54Eb of the locking mechanism 54 meshes with the gear portion 56Aa of the ratchet 56A of the memory mechanism 56 and the locking mechanism 54 locks the position of the ratchet 56A of the memory mechanism 56.

Figure 11:
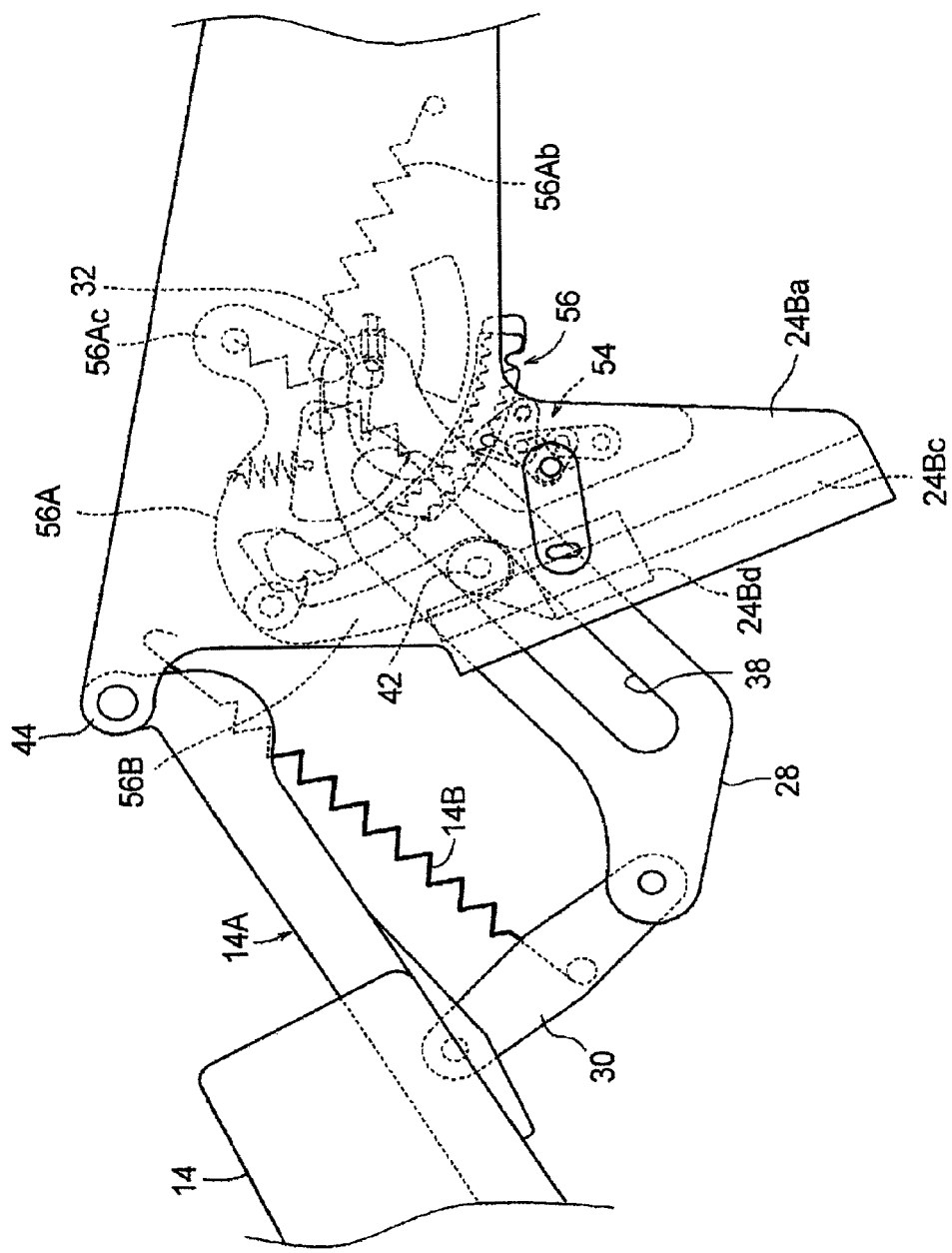
FIG. 11 is an explanatory view similar to FIG. 6, illustrating a state where an unfolded angle of the ottoman is adjusted in the above example.

FIG. 11 illustrates a state where the seatback is tilted largely backward similarly to FIG. 10 and only the angle of the ottoman 14 is adjusted without changing a tilted position of the seatback. Note that, in FIG. 11, a configuration of the memory mechanism 56 is simplified. In order to adjust the angle of the ottoman 14 as such, a cable (not shown) for operating the locking mechanism 54 is operated as described above to unlock the locking mechanism 54, and in this state, the angle of the ottoman 14 is adjusted to a given angle. The angle adjustment of the ottoman 14 is performable by adjusting a gravity to be added to the ottoman 14 by legs put on the ottoman 14. A tension spring 14B (an example of a biasing mechanism of the present invention) is provided over between the pivotal support connection 44, which is a rotating center of the ottoman 14, and the link member B 30, so that the ottoman 14 is biased by a tensile force of the tension spring 14B from the stored position to the unfolded position. As described based on FIG. 7, the tension spring 56Ab is provided over between the ratchet 56A and the base frame 24A (see FIG. 2). The ratchet 56A is biased counterclockwise around the pivot shaft 56Ac by the tensile force of the tension spring 56Ab. Here, the tension spring 14B is set so that the tensile force is larger than that of the tension spring 56Ab. As a result, in a state where the locking mechanism 54 is unlocked, the ottoman 14 is biased by the tensile force of the tension spring 14B in a direction where the unfolded angle is increased. Accordingly, by adjusting the force to be added to the ottoman 14 as described above, it is possible to adjust the unfolded angle of the ottoman 14. When the locking mechanism 54 is unlocked so as to adjust the angle of the ottoman 14 as such, the connecting pin member 42 moves along the guide rail 24Bc and the position of the connecting pin member 42 within the guide slot 38 of the link member A 28 is changed. That is, a distance between the pin connection 32 and the connecting pin member 42 is changed. As this distance is shorter, a force to be added to the link member A 28 via the link member B 30 is amplified by a principle of a "lever" and transmitted to the connecting pin member 42. Accordingly, when the unfolded angle of the ottoman 14 is set to be large, it is possible to amplify the force to be added to the ottoman 14 from the legs and to transmit it to the slide portion 24Ba, thereby making it possible to decrease an operating force at the time when the seatback is raised toward the normal usage position from a state where the seatback is tilted backward. Note that in a state where the ottoman 14 is placed at the stored position like FIGS. 7, 8, the tension spring 14B is placed at a position where the link member A 28 does not receive or hardly receives a rotation moment due to the tensile force of the tension spring 14B, so that the ottoman 14 is not biased toward the unfolded position. On that account, as described based on FIG. 8, when the ottoman 14 is placed at the stored position, the connecting pin member 42 is moved by the tensile force of the tension spring 56Ab to a position away from the pin connection 32. However, the tensile force of the tension spring 14B does not affect the movement.

Figure 14A:
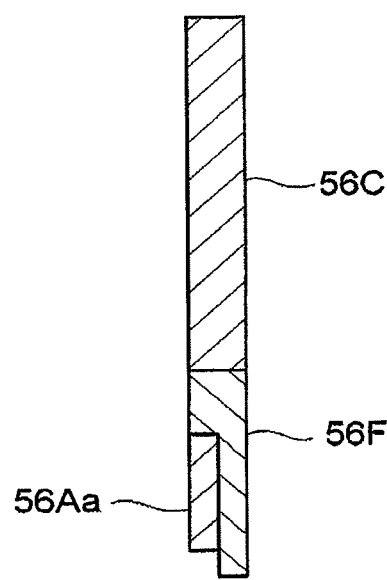
FIG. 14A is an enlarged sectional view taken along a line A-A in FIG. 12 at a meshing position of gears.
Figure 14B:
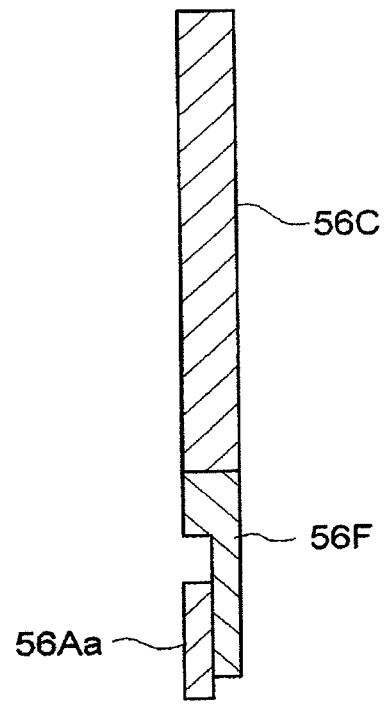
FIG. 14B is an enlarged sectional view taken along the line A-A in FIG. 12 at a meshing-released position of the gears.

Next will be described the memory mechanism 56. As illustrated in FIG. 12, the gear portion 56Aa is provided along an arc around the pivot shaft 56Ac, at a position apart from the pivot shaft 56Ac of the ratchet 56A, and gears are formed on both an outer peripheral side and an inner peripheral side of the arc of the gear portion 56Aa. The gear on the outer peripheral side is formed so that the lock pin 54Eb of the locking mechanism 54 meshes therewith, and a memory plate 56F is provided so as to mesh with the gear on the inner peripheral side. As illustrated in FIG. 14, the memory plate 56F engages with the gear portion 56Aa, and is movable between a position where the gear on the inner peripheral side of the gear portion 56Aa meshes with that gear (not shown) of the memory plate 56F which is provided opposed to the gear as illustrated in FIG. 14A and a position where the gear of the memory plate 56F is away from the gear on the inner peripheral side of the gear portion 56Aa so that their meshing is released as illustrated in FIG. 14B. A cam 56C is provided adjacent to the memory plate 56F. When the memory plate 56F is pushed by the cam 56C, the memory plate 56F moves to a position where the memory plate 56F meshes with the gear on the inner peripheral side of the gear portion 56Aa. A tension spring 56Fa is provided over between the memory plate 56F and the pivot shaft 56Ac of the ratchet 56A, and when the memory plate 56F is not pushed by the cam 56C, the memory plate 56F is separated from the gear on the inner peripheral side of the gear portion 56Aa. A stopper 56D and a guide 56E are provided respectively at positions corresponding to respective ends of the memory plate 56F. The stopper 56D regulates a range in which the memory plate 56F moves along its arc shape together with the gear portion 56Aa. The guide 56E is configured as follows: when the memory plate 56F meshes with the gear on the inner peripheral side of the gear portion 56Aa, the guide 56E allows the memory plate 56F to move along its arc shape; and when the memory plate 56F is separated from the gear on the inner peripheral side of the gear portion 56Aa, the guide 56E regulates the memory plate 56F from moving along its arc shape. Accordingly, in a state where the memory plate 56F does not mesh with the gear on the inner peripheral side of the gear portion 56Aa, the stopper 56D and the guide 56E prevent the memory plate 56F from moving in either of front and back directions along the arc shape. In the meantime, in a state where the memory plate 56F meshes with the gear on the inner peripheral side of the gear portion 56Aa, the stopper 56D and the guide 56E move the memory plate 56F along the guide 56E together with the gear portion 56Aa of the ratchet 56A, but do not allow the memory plate 56F to move forward from the stopper 56D. The stopper 56D and the guide 56E are formed on an inner wall of the abovementioned cover (not shown) of the slide portion 24Ba. Further, the cam 56C is connected to the cable 58. When the reclining lever (not shown) that is operated to adjust the tilted position of the seatback is operated, the cable 58 pulls the cam 56C as illustrated in FIG. 12, so as to pivot the cam 56C around its pivot shaft 56Cb. At this time, the cam 56C pushes the memory plate 56F so as to move the memory plate 56F to the position where the memory plate 56F meshes with the gear on the inner peripheral side of the gear portion 56Aa. When the operation on the reclining lever (not shown) is ended, the cable 58 is put back and the cam 56C is pulled by the tension spring 56Ca and pivots, thereby removing the press against the memory plate 56F, so that the memory plate 56F is separated from the gear on the inner peripheral side of the gear portion 56Aa.

Next will be described an action of the memory mechanism 56. In a state where the seatback is tilted backward from the normal usage position and the ottoman 14 is placed at the unfolded position, when the cable (not shown) is operated to unlock the locking mechanism 54 and the unfolded angle of the ottoman 14 is adjusted to a given angle as described above, the connecting pin member 42 is moved to a position according to the unfolded angle of the ottoman 14. At this time, the ratchet 56A connected to the connecting pin member 42 is also moved together with the gear portion 56Aa. That is, the gear portion 56Aa is moved along a lower surface of the guide 56E. On the other hand, in a state where the reclining lever (not shown) is not operated, the cam 56C does not press the memory plate 56F. Accordingly, even if the memory plate 56F is separated from the meshing state with the gear portion 56Aa and the gear portion 56Aa moves along the lower surface of the guide 56E, the memory plate 56F is stopped by the guide 56E and does not move together with the gear portion 56Aa. When the adjustment of the unfolded angle of the ottoman 14 is completed and the operation of the cable (not shown) is ended, the lock pin 54Eb of the locking mechanism 54 meshes with the gear on the outer peripheral side of the gear portion 56Aa, and the unfolded angle of the ottoman 14 is locked. When the seatback is put back to the normal usage position or the backward tilting angle of the seatback is changed after that, the cable 58 is pulled so as to pivot the cam 56C at the time of operating the reclining lever (not shown), so that the memory plate 56F is placed to a position where the memory plate 56F meshes with the gear portion 56Aa. In view of this, even in a case where the locking mechanism 54 is unlocked along with the operation of the reclining lever, when the ratchet 56A moves along with changes of the unfolded angle of the ottoman 14, the memory plate 56F also moves together. Thus, a previously adjusted position of the ottoman 14 is memorized and maintained as the unfolded angle position of the ottoman 14 along with the backward tilting of the seatback. As described earlier, when the seatback is placed at the normal usage position and the ottoman 14 is placed at the stored position, the locking mechanism 54 is unlocked. Accordingly, the connecting pin member 42 moves downward along the guide slot 38, and the ratchet 56A also pivots so that the gear portion 56Aa moves below the guide 56E. At this time, the gear portion 56Aa moves together with the memory plate 56F, and thus, that unfolded angle of the ottoman 14 which is adjusted is kept memorized. Accordingly, in this state, even if the locking mechanism 54 is unlocked, a memory of the unfolded angle position of the ottoman is not canceled. On that account, when the reclining lever is operated subsequently to tilt the seatback backward and the link member A 28 is accordingly pushed by the connecting pin member 42 so that the ottoman 14 is moved from the stored position to the unfolded position, the tension spring 14B overcomes a biasing force of the tension spring 56Ab so as to unfold the ottoman 14 by adjustment of the gravity of the legs as described above, so that the unfolded angle is determined at a position where an end portion of the memory plate 56F abuts with the stopper 56D. This unfolded angle is an angle memorized when the memory plate 56F meshes with the gear portion 56Aa as described above, and thus, the unfolded angle of the ottoman 14 is set to an angle memorized by the memory mechanism 56. Note that an unfolded operation of the ottoman 14 is stopped at the position where the end portion of the memory plate 56F abuts with the stopper 56D, but it is still possible to continue the backward tilting operation of the seatback.

Specific embodiments have been described above, but the invention is not limited to the appearances and the configurations described in the above embodiments, and various modifications, additions, and deletes are performable as far as they do not change a gist of the invention. For example, 1. a prohibition mechanism is not limited to one described in the above example which is configured such that when the ottoman is placed at the stored position, the ratchet moves so that the memory plate is pressed by the guide serving as a prohibition member, thereby preventing the memory plate from being separated from the gear portion of the ratchet. The prohibition mechanism may be configured such that the ratchet does not move and the memory plate is pressed by the gear portion of the ratchet due to the prohibition member.

What is claimed is:

1. A seatback-associated ottoman device for a vehicle seat in which an angle of a seatback is adjustable with respect to a seat cushion and which includes an ottoman provided in front of the seat cushion, the seatback-associated ottoman device comprising:

an association mechanism that operates the seatback and the ottoman in association with each other, wherein, when the seatback is placed at a normal usage position suitable for sitting, the association mechanism causes the ottoman to be stored in a stored position in a front lower portion of the seat cushion, and when the seatback is tilted backward from the normal usage position, the association mechanism moves the ottoman from the stored position to an unfolded position in front of the seat cushion so as to support legs of an occupant from a lower side;

an angle adjustment mechanism that adjusts, to a given angle, an unfolded angle of the ottoman placed at the unfolded position;

a memory mechanism that mechanically memorizes an unfolded angle position of the ottoman and cancels the memorized unfolded angle position when the unfolded angle of the ottoman is adjusted by the angle adjustment mechanism; and a prohibition mechanism that prohibits the canceling of the memorized unfolded angle position of the memory mechanism when the ottoman is placed at the stored position.

2. The seatback-associated ottoman device according to claim 1, wherein:

the association mechanism includes a pivot link which is configured to be pivotally fixed to a base member supporting the vehicle seat and which is connected to the ottoman, a forward-backward moving member that moves in a front-rear direction according to an angle adjustment of the seatback, and a connecting body that connects the forward-backward moving member to the pivot link so as to transmit their respective movements to each other, the connecting body being configured to change a connecting position of the forward-backward moving member with respect to the pivot link;

the angle adjustment mechanism includes a ratchet connected to the connecting body, and a locking mechanism that is configured to selectively lock and unlock at least one of the ratchet and the connecting body with respect to the forward-backward moving member, the locking mechanism being unlocked when the ottoman is placed at the unfolded position and the unfolded angle thereof is adjusted and when the angle adjustment of the seatback is performed;

the memory mechanism includes a memory piece engaging with the ratchet while the angle adjustment of the seatback is performed, so as to memorize the unfolded angle of the ottoman, and a stopper that stops unfolding of the ottoman when the memory piece abuts the stopper, the stopper being provided on a path of movement of the memory piece that moves in association with movement of the ratchet that moves along with movement of the ottoman in an unfolded direction; and the prohibition mechanism is a prohibition member that presses the memory piece so as to prevent the memory piece from being disengaged from the ratchet when the ottoman is placed at the stored position.

3. A vehicle seat in which an angle of a seatback is adjustable with respect to a seat cushion, the vehicle seat comprising:

an ottoman provided in front of the seat cushion; and a seatback-associated ottoman device including:

an association mechanism that operates the seatback and the ottoman in association with each other, wherein, when the seatback is placed at a normal usage position suitable for sitting, the association mechanism causes the ottoman to be stored in a stored position in a front lower portion of the seat cushion, and when the seatback is tilted backward from the normal usage position, the association mechanism moves the ottoman from the stored position to an unfolded position in front of the seat cushion so as to support legs of an occupant from a lower side;

an angle adjustment mechanism that adjusts, to a given angle, an unfolded angle of the ottoman placed at the unfolded position;

a memory mechanism that mechanically memorizes an unfolded angle position of the ottoman and cancels the memorized unfolded angle position when the unfolded angle of the ottoman is adjusted by the angle adjustment mechanism; and a prohibition mechanism that prohibits the canceling of the memorized unfolded angle position of the memory mechanism when the ottoman is placed at the stored position.

4. The vehicle seat according to claim 3, wherein:

the association mechanism includes a pivot link which is pivotally fixed to a base member supporting the vehicle seat and which is connected to the ottoman, a forward-backward moving member that moves in a front-rear direction according to an angle adjustment of the seatback, and a connecting body that connects the forward-backward moving member to the pivot link so as to transmit their respective movements to each other, the connecting body being capable of changing a connecting position of the forward-backward moving member with respect to the pivot link;

the angle adjustment mechanism includes a ratchet connected to the connecting body, and a locking mechanism that is configured to selectively lock and unlock at least one of the ratchet and the connecting body with respect to the forward-backward moving member, the locking mechanism being unlocked when the ottoman is placed at the unfolded position and the unfolded angle thereof is adjusted and when the angle adjustment of the seatback is performed;

the memory mechanism includes a memory piece engaging with the ratchet while the angle adjustment of the seatback is performed, so as to memorize the unfolded angle of the ottoman, and a stopper that stops unfolding of the ottoman when the memory piece abuts the stopper, the stopper being provided on a path of movement of the memory piece that moves in association with movement of the ratchet that moves along with movement of the ottoman in an unfolded direction; and the prohibition mechanism is a prohibition member that presses the memory piece so as to prevent the memory piece from being disengaged from the ratchet when the ottoman is placed at the stored position.

\* \* \* \* \*